(12) United States Patent
Meyer-Gräfe et al.

(10) Patent No.: US 7,802,150 B2
(45) Date of Patent: Sep. 21, 2010

(54) ENSURING MAXIMUM REACTION TIMES IN COMPLEX OR DISTRIBUTED SAFE AND/OR NONSAFE SYSTEMS

(75) Inventors: Karsten Meyer-Gräfe, Hövelhof (DE);
Johannes Kalhoff, Blomberg (DE);
Steffen Horn, Schieder-Schwalenberg (DE); Viktor Oster, Blomberg (DE);
Oliver Stallmann, Bünde (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 1660 days.

(21) Appl. No.: 10/848,629

(22) Filed: May 19, 2004

(65) Prior Publication Data
US 2004/0243728 A1    Dec. 2, 2004

(30) Foreign Application Priority Data
Mar. 6, 2003    (DE) .................... 103 25 263

(51) Int. Cl.
*G06F 11/00* (2006.01)
(52) U.S. Cl. ................... 714/48; 714/55; 713/375
(58) Field of Classification Search ............ 714/12, 714/43, 55, 47, 48; 709/248; 713/375
See application file for complete search history.

(56) References Cited
U.S. PATENT DOCUMENTS

| | | | | |
|---|---|---|---|---|
| 4,535,449 A | * | 8/1985 | Arragon ............... | 370/457 |
| 4,633,039 A | * | 12/1986 | Holden ............... | 379/32.01 |
| 4,930,124 A | * | 5/1990 | de Boisseron et al. ....... | 370/400 |
| 5,157,780 A | * | 10/1992 | Stewart et al. ............ | 714/31 |
| 5,502,812 A | * | 3/1996 | Leyre et al. ............... | 714/10 |
| 5,561,767 A | * | 10/1996 | Eisenberg et al. ........... | 714/47 |

(Continued)

FOREIGN PATENT DOCUMENTS

DE    19909091    9/2000

(Continued)

OTHER PUBLICATIONS

Kopetz, H., et al., "TTP—A Protocol for Fault-Tolerant Real-Time Sytems," Computer, IEEE Serv. Center, CA, pp. 14-23, Jan. 1994.

(Continued)

*Primary Examiner*—Robert Beausoliel
*Assistant Examiner*—Elmira Mehrmanesh
(74) *Attorney, Agent, or Firm*—Ohlandt, Greeley, Ruggiero & Perle, LLP

(57) ABSTRACT

A data processing system ensures maximum reaction times. A novel and significantly improved way of ascertaining, checking and/or observing maximum reaction times in data processing systems includes complex or distributed, safe and/or nonsafe systems, particularly between a safe input signal and the corresponding safe output signal, in a flexible and universally applicable manner. Input and/or output data, which are present on the input side of users incorporated in the system, are read in synchronously during each data cycle and checked in relation to currency parameters, which are based on at least one data cycle and associated with the input and/or output data An error is identified in response to a defined discrepancy being reached between at least one currency parameter and a defined currency threshold, and a defined function, particularly a safety-oriented function, are triggered in response to identification of an error.

27 Claims, 3 Drawing Sheets

U.S. PATENT DOCUMENTS

| | | | | |
|---|---|---|---|---|
| 5,754,757 | A | * | 5/1998 | Shrivastava et al. ............ 714/11 |
| 6,055,660 | A | * | 4/2000 | Meaney ...................... 714/732 |
| 6,141,630 | A | * | 10/2000 | McNamara et al. ........... 703/14 |
| 6,327,630 | B1 | * | 12/2001 | Carroll et al. ................ 719/314 |
| 6,532,508 | B2 | * | 3/2003 | Heckel et al. ................ 710/110 |
| 6,631,476 | B1 | * | 10/2003 | Vandesteeg et al. ............. 714/4 |
| 6,832,343 | B2 | * | 12/2004 | Rupp et al. ................... 714/47 |
| 6,947,868 | B2 | * | 9/2005 | Ernst et al. .................. 702/176 |
| 7,152,188 | B1 | * | 12/2006 | Meyer-Grafe et al. ......... 714/43 |
| 7,162,311 | B2 | * | 1/2007 | Muneta et al. ................ 700/21 |
| 7,287,184 | B2 | * | 10/2007 | Gibart et al. .................. 714/11 |
| 2003/0051053 | A1 | * | 3/2003 | Vasko et al. ................ 709/246 |
| 2003/0051203 | A1 | * | 3/2003 | Vasko et al. ................ 714/781 |
| 2005/0010332 | A1 | * | 1/2005 | Abe et al. ................... 700/245 |
| 2005/0060605 | A1 | * | 3/2005 | Gibart et al. .................. 714/11 |
| 2005/0060606 | A1 | * | 3/2005 | Kalan et al. ................... 714/12 |
| 2005/0081117 | A1 | * | 4/2005 | Gibart ........................ 714/47 |

FOREIGN PATENT DOCUMENTS

| | | |
|---|---|---|
| WO | WO98/03910 | 1/1998 |
| WO | WO02/098065 | 8/2001 |

OTHER PUBLICATIONS

Kumar, K. V., et al., "An End-to-End Protocol for Real Time Computer Networks for Safety Applicants," Proceeding fo the Intenational Conference on EC3—Enegry, Computer, Communication and Control Systems, pp. 289-292, Aug. 1991.

Kopetz, H., "Should Responseve Systems Be Event-Triggered or Time-Triggered?," IEICE Transactions on Information and Systems, Info. & Systems Soc., pp. 1325-1332, Nov. 1993.

Ming T. Liu, "Protocol Engineering," Advances in Computers, pp. 79-195, 1989.

Divyakant, Agrawal, et al., " Recovering from Multiple Process Failures in the Time Warp Mechanism," IEEE Transactions on Computers, IEEE Serv. Center, pp. 1504-1514, Dec. 1992.

Susuki, I., "Specification and Verification of the Alternating Bit Protocol by Temporal Petri Nets," Proceedings of the $32^{nd}$ Midwest Symposium on Circuits and Systems, pp. 157-160; Aug. 1989.

Search Report dated Nov. 13, 2007 corresponding to European Patent Application No. EP04011340.

Office Action dated Jul. 3, 2009 corresponding to Chinese Patent Application No. 200410047335.5.

* cited by examiner

ENSURING MAXIMUM REACTION TIMES IN COMPLEX OR DISTRIBUTED SAFE AND/OR NONSAFE SYSTEMS

CROSS-REFERENCE TO RELATED APPLICATION

The present application claims priority of application serial number 103 25 263.0 filed on Jun. 3, 2003 in Germany.

BACKGROUND OF THE INVENTION

1. Field of the Invention

The invention relates to a method and a system for ensuring maximum reaction times in a data processing system, particularly between a safe input signal and the corresponding safe output signal.

2. Description of Related Art

In communicating data processing systems or installations, data in a message are usually valid only at a particular time or for a particular time because, particularly in the case of safety-related input/output signals, stipulated reaction times need to be observed.

On the basis of the prior art, delay time monitoring between transmitter and receiver is usually performed for this purpose. For receiver-end delay time monitoring, the transmitter appends an appropriate time information item to the data, with both the transmitter and the receiver needing to track the time. For transmitter-end monitoring, reception of the data is acknowledged to the transmitter by returning an acknowledgement signal, this additionally allowing the correct data sequence to be monitored.

Assuming that the data transmission comprises signals transmitted continuously and in the correct time sequence, German patent specification DE-101 02 435-C2 also discloses a method which ensures that a safe data transmission is checked, on the one hand, and also ensures a maximum possible or feasible delay in the transmission of a subsequent signal. This involves the specific proposal that data processing units which communicate with one another transmit data by initiating the sending of a subsequent signal only in response to a minimum time elapsing between two successive signals and in response to an acknowledgement signal from the receiving unit being received at the transmitter end.

BRIEF SUMMARY OF THE INVENTION

It is an object of the invention to provide a novel and significantly improved way, as compared with the known prior art, of ascertaining, checking and/or observing maximum reaction times in data processing systems, including complex or distributed, safe and/or nonsafe systems, particularly between a safe input signal and the corresponding safe output signal, in a flexible and universally applicable manner.

The invention achieves the object, highly surprisingly, merely by means of the subject matter having the features of the appended independent patent claims.

Advantageous and/or preferred embodiments and developments are the subject matter of the respective dependent claims.

On the basis of the method proposed by the invention, involving input and/or output data which are present on the input side of users incorporated in the system being read in synchronously during each data cycle, input and/or output data which have been read in being checked in relation to currency parameters which are based on at least one data cycle and are or can be associated with the input and/or output data which have been read in, an error being identified in response to a defined discrepancy being reached between at least one currency parameter and a defined currency threshold, and a defined function, particularly a safety-oriented function, being triggered in response to identification of an error, there is therefore the possibility, for the first time, of directly monitoring input/output information handling which is consecutive on a system specific basis and/or is in the correct time sequence and of ensuring maximum reaction times on the basis of this by users independently.

The invention is thus used, in particular, for systems in which it is important to ensure that particular outputs adopt a defined state when no corresponding current input information is available, for example during time-critical monitoring of a safe input signal for the reaction of a corresponding safe output signal.

In one preferred form, input and/or output data which have been read in are checked during each data cycle in order to ensure, flexibly and particularly effectively, reaction times in line with the application specific transport of data, particularly at fixed and determinable intervals, periods and/or times, including across system boundaries, intelligent units and/or within networks.

To synchronize the read-in operation, the invention preferably provides for a broadcast and/or latch signal to be transmitted at least intermittently to all users. To provide the permanent assurance of a transport relationship, defined in fixed limits and/or at one time, on the data path in the transmission and/or reception direction with all of the influencing units situated particularly in the safe data stream, the invention thus advantageously allows, for practical implementation, the use of system specific mechanisms which are able to ensure that all users receive a CLOCK SIGNAL/PULSE at the same time.

In one development of the invention, the synchronization is performed upon starting (the bus) and/or after an error by a particular user, in one preferred embodiment by the master.

If, in line with preferred embodiments, the synchronous data acceptance is performed using a ring shift register, then each user, particularly when utilizing the properties of the interbus, expediently receives a CLOCK SIGNAL/PULSE in sync with all of the users after the data have been shifted, the user being able to accept the output data, and the input data being read in.

To be able to perform currency verification for input and/or output data which have been read in particularly easily and with a bit saving for the transmission protocol, at least one intelligent unit having driver-like means is provided which assigns currency parameters to the data which are to be read in, said currency parameters being unique and/or able to be associated with fixed time and/or cycle structures.

In this context, one preferred development provides for cycle-based values, for example, such as a recurring serial number, to be transmitted to all reading users, e.g. the slaves, in every data cycle with currency parameters coming from a particular user, e.g. the master, said cycle-based values being received back by the master in a subsequent data cycle from the slaves for verification purposes after the data which have been read in have been processed.

In line with another preferred development, each user concurrently counts the (valid) data cycles in relation to the time of the read-in operation. A fundamental advantage in this context is that data based on input and/or output data which have been read in are easily forwarded only up to a defined number of counted data cycles, and otherwise errors are identified. In this case, provision is preferably made for each user forwarding data again to add its own (data cycle) time of the read-in operation to a read-in time which has already been obtained from the currency parameter.

The invention thus preferably comprises embodiments in which a value or data item is returned as a currency parameter to the user producing the value or data item after user specific data processing and/or forwarding, or a currency evaluation is performed by the reading user, particularly an output user, itself.

Since the currency evaluation is thus based, in particular, on the time needed for handling data which have been read in, a check is made possible, in an extremely efficient manner, to determine whether user specific data processing and/or forwarding takes place within a prescribed/prescribable maximum time, including processing of input data to produce output data by the master.

On an application specific basis, provision is thus also preferably made for a defined measure, particularly a safety measure, to be introduced in response to an identified maximum reaction threshold time as appropriate by the user which produces currency parameters and/or by the respective reading user, particularly by an output user or a user having an associated output model.

If it is ensured, for example when implementing the invention, that input data are processed by a selected user, preferably by the master to produce output data, within a prescribed/prescribable maximum time, the synchronous acceptance of information means that this allows an output user independently to determine and/or monitor the maximum permissible aging time for an input information item which has been read in.

Consequently, a user which knows that its data which have been read in, which it received in a particular cycle, have been calculated from input data coming from the preceding data cycle can reset a watchdog associated with the user to the time of the last data cycle.

Since the users may include input users and output users and/or masters and slaves, the invention can therefore be used for essentially any data processing system, with master functions also being able to be forwarded in a similar manner to a token ring system, for example.

To implement the invention, at least one user therefore has an evaluation unit and a reaction comparison device, in one preferred embodiment the user or users with driver-like means which produce currency parameters.

If a data processing system adapted in line with the invention also comprises system couplers, then watchdog times associated with the system coupler are split, since the system coupler performs both the function of the master in an underlying system and that of a slave in the overlying system.

The extremely flexible variation options thus mean that the invention can preferably be used in data processing systems in which the communication for forwarding the data from one slave to another and/or for altering the data takes place via a master or takes place without a master directly between two slaves.

As further preferred embodiments, the invention comprises, in particular, applications in which the master is a safe controller and/or the slaves have safe digital/analog inputs and/or safe digital/analog outputs and/or which have a mixture of safe and/or normal users with and/or without time information on the same bus too.

BRIEF DESCRIPTION OF THE SEVERAL VIEWS OF THE DRAWINGS

The invention is described by way of example below using preferred embodiments with reference to the appended drawings, in which.

DETAILED DESCRIPTION OF THE INVENTION

The text below first refers to FIG. 1, which gives a highly simplified illustration of elements of a standard network system for operating an automation installation which are fundamental to the invention.

On the basis of such a data processing system, at least one input user or an input module associated with a user preferably reads in input data. These data are output as output data after processing by an output user or an output module associated with a user. Processing may be performed in the same user or, after the input data have been forwarded, by another user which, when the input data have been processed to produce output data, outputs said output data or transfers them to another user for output.

Figure 1:
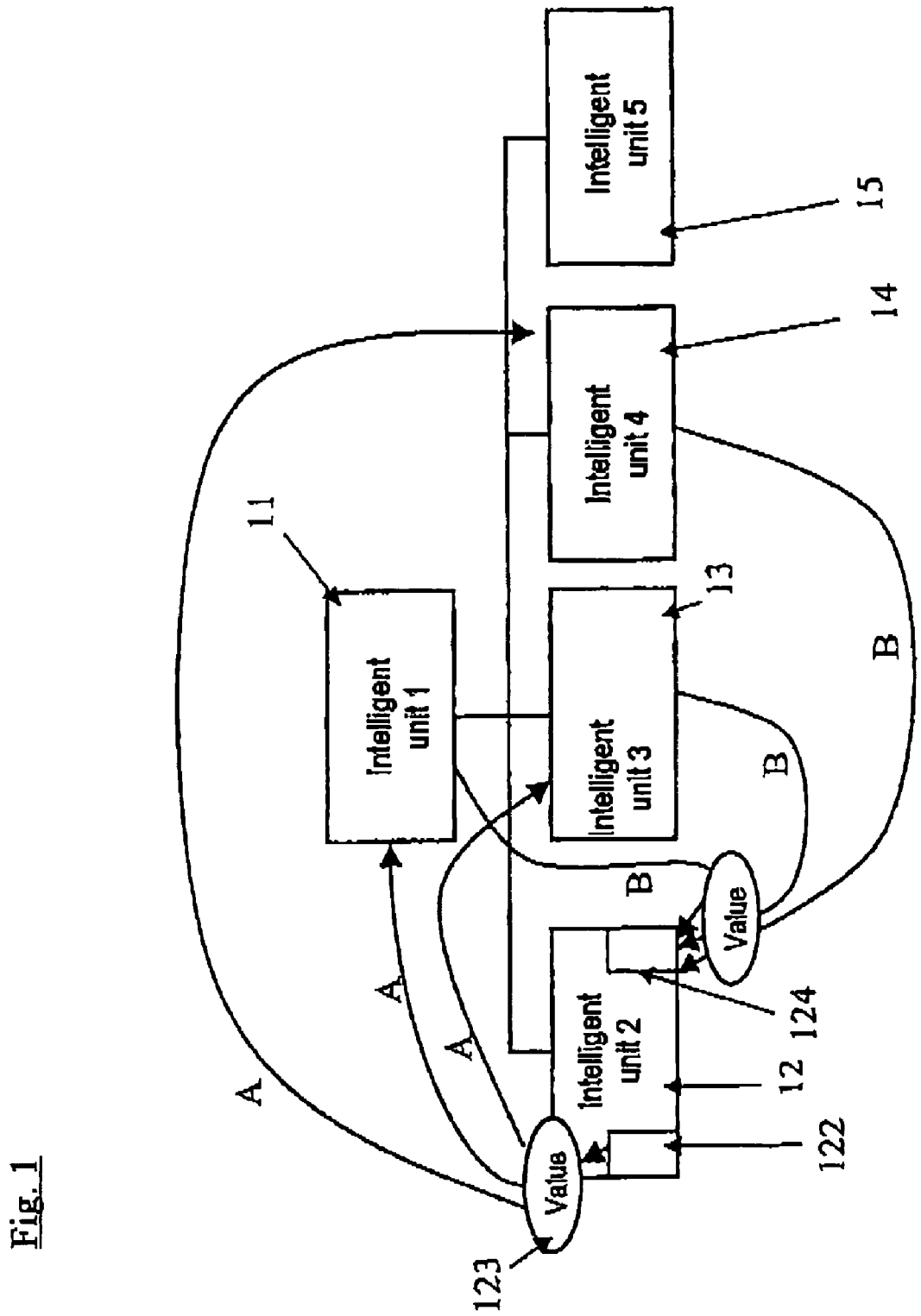
FIG. 1 illustrates a first preferred embodiment of the invention by showing a greatly simplified basic outline of a system for operating an automation installation, comprising a plurality of inventive user components which each have an associated intelligent unit.

Specifically, FIG. 1 shows a number of users 11, 12, 13, 14 and 15 which are incorporated in the standard network system and each have an intelligent unit 1, 2, 3, 4 or 5, which are provided for defined applications and/or at defined positions in the network.

The intelligent units 1, 2, 3, 4 and 5 associated with the users 11, 12, 13, 14 and 15 thus preferably comprise installation specific installation components, such as sensors and/or actuators, and also have an associated logic unit (not shown in more detail) for appropriate user specific processing of data.

In the application shown by way of example in FIG. 1, at least the intelligent unit 2 associated with the user 12 comprises driver-like means 122 which produce alternating values 123 which are available in unique form and in fixed time frames over a relatively long period of time.

To monitor and/or establish reaction times between safe input data and the corresponding safe output data, the user 12 transmits the values 123, as marked by the arrows A, synchronously to all intelligent units forwarding and/or processing safe data, in the present example to the intelligent units 1, 3 and 4.

The transmitted values 123 are then read in by the users 11, 13 and 14 provided for processing safe data, together with safe input and/or output data currently present in the corresponding data cycle. When these data which have been read in have been processed further and/or forwarded by the respective intelligent units 1, 3 and 4, the value 123 assigned in an appropriate manner beforehand is reported back to the value-producing user 11, as marked by the arrows B. An evaluation unit 124 in the intelligent unit 2 is used by the user 11 to evaluate the respectively returned values 123 in order to ascertain a respective reaction time for processing the safe data which have been read in to produce corresponding output safe data.

Depending on the reaction time ascertained, the user 12 can initiate appropriate measures. In particular, the triggering of a safety-oriented measure is initiated after a prescribed or prescribable maximum permissible reaction time has been exceeded.

In addition, provision is preferably made for the user 12 to identify errors if at least one of the transmitted values 123 has not yet been transmitted back after the maximum permissible reaction time.

In this context, the inventive mechanisms in the network system provided in line with FIG. 1, which are used to generate and transmit the values 123, which are data-cycle and/or processing-cycle based, in particular, consequently ensure a synchronizing broadcast response which, for all of the influencing users which are in the safe data stream, is used to ensure a transport relationship, defined in fixed limits and/or at a particular time, on the data path in the transmission and/or reception direction.

As also described below in an alternative embodiment with reference to FIGS. 2 and 3, the inventive approach can thus be matched to a multiplicity of different data processing networks and/or systems on an application specific basis in order to check, establish and/or observe reaction times or can be adapted in line with the respective safe and/or nonsafe structure in central form, for example within computer systems and the design thereof, local form, for example in the case of bus systems, or locally coupled form, for example using system couplers, transformers and/or routers across system boundaries.

Figure 2:
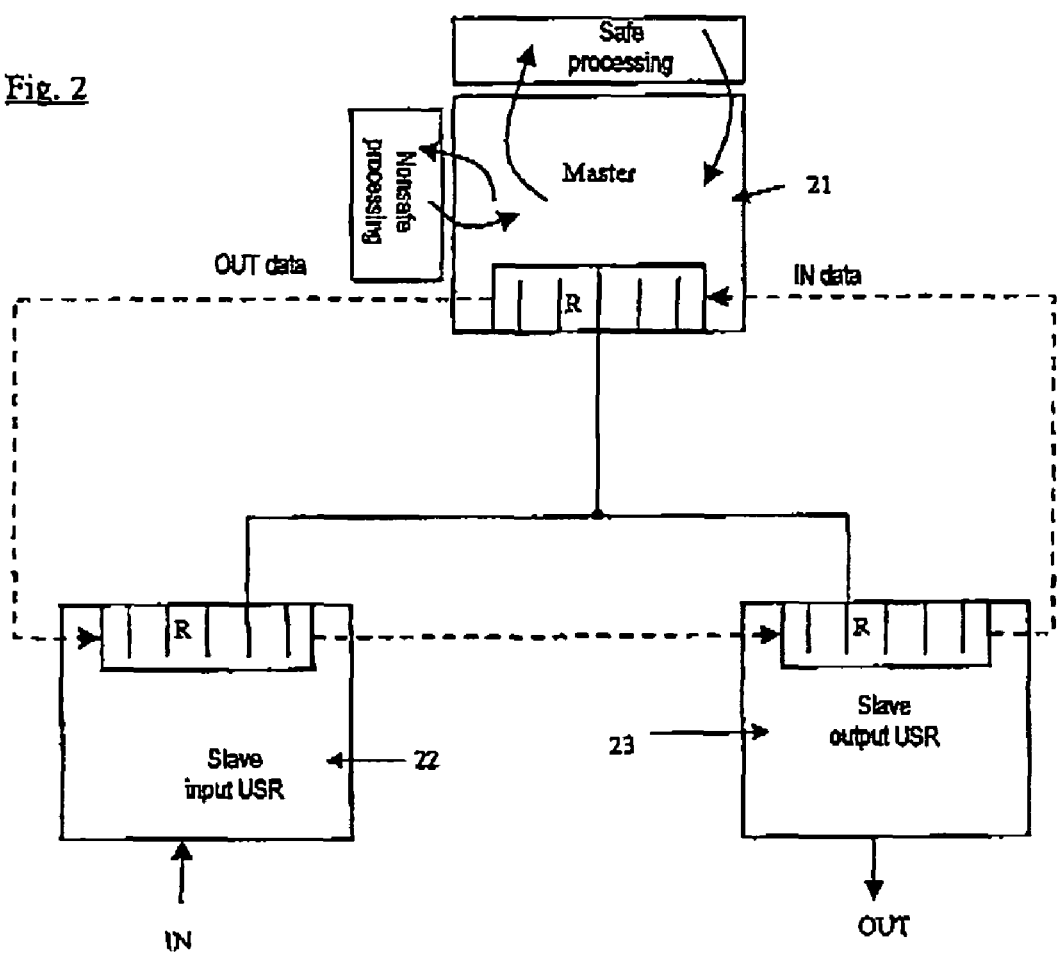
FIG. 2 shows a highly schematic master/slave system for illustrating further preferred embodiments of the invention.

FIG. 2 outlines a master/slave ring shift bus with a user 21 acting as a master and two users 22 and 23 acting as slaves. In this context, the user 22 is an input user which reads in input data from the peripheral area, as indicated by the arrow IN, and forwards corresponding input or IN data to the master 21 for safe and/or nonsafe processing to produce output or OUT data. When the master 21 has processed the IN data to produce OUT data, these data are transmitted to the slaves 22 and 23, whereupon the output user 23, having read in the OUT data, outputs corresponding data to the appropriate peripheral area, as indicated by the arrow OUT.

The data to be processed are transferred to all of the users 21, 22 and 23, incorporated in the system for the purpose of data processing, in a data cycle using a ring shift register R, with all users 21, 22, 23 being instructed to accept data synchronously on a network and/or system specific basis.

The synchronization can also be performed in another way on a network specific basis. Thus, by way of example, an ETHERNET based system may be used to use a broadcast signal as a type of latch signal or CLOCK SIGNAL/PULSE in order to order the data acceptance.

Assuming that, during correct operation, respective data processing operations, i.e. essentially user specific data processing operations and/or data forwarding operations, take place within a prescribed/prescribable maximum time, that is to say, in particular, the processing of the IN data to produce OUT data by the master 21 also takes place within a prescribed/prescribable maximum time, the invention thus allows basically any user 21, 22 and 23, preferably the output user 23, in particular, to determine the maximum time for the age of information which has been read in and therefore to monitor the currency thereof. The reaction time thus actually forms a direct temporal relationship between the OUT data and the IN data without the need to transmit additional information using the transmission protocol.

If additional information is needed, for example for the application specific monitoring of individual users, of the transmission over system boundaries, of individual bus faults and/or of incorrect synchronization operations, it may be necessary to provide one or more bits for this purpose in the transmission protocol.

If the user thus identifies that data which have been read in are no longer valid, for example on the basis of an interruption in a bus cable, that is to say the maximum time for data currency has elapsed, then a particular output is switched to the safe state. The introduction of specific, in particular safety-oriented, measures within a prescribed reaction time is therefore assured.

In a first preferred embodiment based on this, each user 21, 22 and 23 concurrently counts the (valid) data cycles. Upon starting (the bus) and/or after an error, the synchronization is performed by one particular user, such as by the master 21, preferably as a result of an appropriate signal. Each user 21, 22 and 23 indicates the time at which the incoming data are read in relation to the preceding (valid) data cycle, which in essence sets a relative time reference. Expediently, time dimensions corresponding to the length between the past data cycles are used for the reading times.

If, by way of example, a user's input data item comes from the preceding data cycle, then the user returns a 1, and if the data come from the data cycle preceding that, it returns a 2. This is admissible only up to a maximum magnitude, however, which means that after a prescribed or prescribable magnitude for an input data item the latter is identified as being too old.

If, in line with one preferred embodiment, a currency value of 7, for example, involves the automatic assumption that the data are too old, then three bits are sufficient for the time information, and each user 21, 22 and 23 can calculate precisely how old the data are and whether the data are still sufficiently current. It follows from this that data which are no more than six data cycles old are forwarded, with each user which forwards data again, e.g. the master 21, which processes the input data to produce output data, adding its own processing time to the reading time obtained from the currency value and forwarding a correspondingly new currency value therefrom.

In a second preferred embodiment, based on FIG. 2, the master 21 transmits a currency value to the slaves 22 and 23 as an accompaniment to every set of OUT data. In the same cycle, the master 21 receives from the slaves 22 and 23 input information indicating the currency value. During correct operation, the currency values transmitted by the slaves 22 and 23 with this input information accordingly need to be identical to the currency value which the master has transmitted to the slaves 22 and 23 in the previous cycle.

In another preferred embodiment, particularly when the properties of the interbus are utilized, each slave 22 and 23 receives, after the data have been shifted, a signal indicating that the users 22 and 23 can accept the OUT data, and the IN data are being read in by the master 21. This signal is received by all users synchronously, that is to say in the form of a target independent signal (TIC—Target Independent Code).

Figure 3:
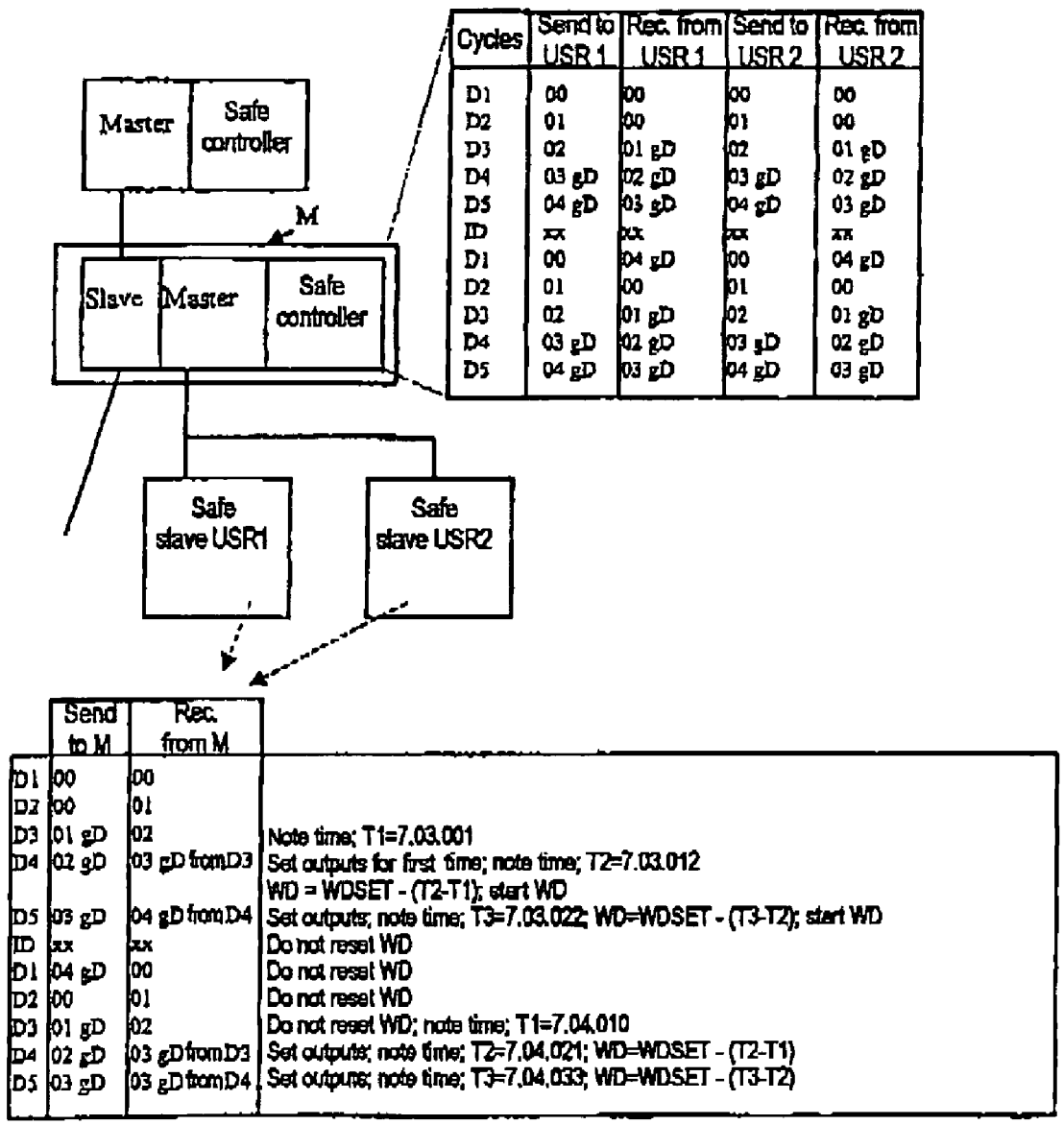
FIG. 3 shows a simplified flowchart of data cycles in line with a master/slave-based design in line with the invention.

With additional reference to the flowchart of consecutive data cycles which is outlined in FIG. 3, the master M sends a zero to all slave users USR1 and USR2 in the first data cycle D1 and/or after an identity (ID) cycle. This zero is used for synchronization. In this data cycle D1, the slaves USR1 and USR2 send a zero or their last counter reading if the data cycle D1 is a cycle after an ID cycle in the course of bus operation.

In the next data cycle D2, that is to say after the slaves USR1 and USR2 have received the zero from the master M, the slaves USR1 and USR2 return the zero. The master M sends the first time value 01 in D2.

The DATA values in the message with which the time value or stamp zero is transmitted are status information items and are not the values which are associated with the peripheral inputs and/or outputs of the slaves USR1 and USR2. It is consequently possible for error information also to be transmitted upon every incorrect synchronization operation or after an error.

In the next data cycle D3, that is to say after the slaves USR1 and USR2 have received the first time value 01 from the master M, the slaves USR1 to USR2 also return this first time value 01 with valid data (gD). The master M sends the second time value 02 for each slave USR1 or USR2 in D3. In addition, the safe slaves USR1 and USR2 concurrently transmit their input information which is valid at this time in this cycle D3. Consequently, each user, that is to say all of the slaves USR1 and USR2 and the master M, on the bus notes this time.

Up to the next cycle D4, the master M has obtained all of the output information from the last input information. In the next cycle D4, this output information is then transmitted with the next time information item 03 to each slave USR1 and USR2 as a result. Since the slave USR1 or USR2 on the bus knows that its output information which has been read in, which it has received with this cycle D4, has been calculated from input information coming from the last data cycle D3, it is able to reset its watchdog WD to the time of the last data cycle D3.

If cycles become defective in the meantime or if a user does not react in good time, then at least one slave or the master sends a zero or an FF or another definable value so that a synchronization operation is first run again and all of the users M, USR1 and USR2 therefore know that their output information comes from obsolete input information. If this output information becomes older than is permitted for an output user or its associated output module, then the latter safely disconnects automatically or performs a safety-oriented function.

Each user M, USR1 and USR2 is thus given its own watchdog time. These do not need to be monitored centrally by the master M. It is also not necessary to send a time concurrently in the protocol.

As a modification to the example described above, another preferred embodiment involves each USR1 and USR2 counting independently.

In particular, it is proposed to this end that the initialization check be followed by each slave USR1 and USR2 starting with 1 as the TIME currency parameter and incrementing it per cycle, whereas the master M starts with 1 only after it has processed the first data from the slaves USR1 and USR2, that is to say one cycle after the slaves have sent the 1. Each user M, USR1 and USR2 thus permits an offset of 1.

TIME=0 thus means that the other data in the message may not be used for IN data or OUT data, whereas TIME< >0 means that the other data in the message can be interpreted as IN data or OUT data.

If the properties of the interbus are again preferably used in this context, then, after the data have been shifted, each user M, USR1 and USR2 thus receives a signal indicating that the user can now accept the OUT data, and/or the IN data are being read in.

In the first data cycle after an ID cycle, the master M thus sends the currency parameters which are valid for the slaves USR1 and USR2, and which each correspond to a repeatedly arising counter reading. The slaves USR1 and USR2 send their respectively valid counter readings as currency parameters in the first data cycle after the ID cycle.

After the system has been turned on (again), i.e. particularly after the master M has been turned on (POWER ON) or restarted (RESET), the master M sends a zero for synchronization to all of the slaves USR1, USR2. The slaves likewise send a zero in the first data cycle after turning on, in the case of the slaves USR1, USR2 being turned on (POWER ON) or restarted (RESET). If the slaves USR1, USR2 have not received a turn-on or restart instruction, then they send their last counter reading as currency parameter.

When the slaves USR1, USR2 have received the zero from the master M, the slaves USR1, USR2 return the zero in the next data cycle.

Once the master M or a slave USR1, USR2 has sent a zero, the two remain in an initialization phase until this phase has been completed as valid by both units.

In this cycle, the master M sends the first currency parameter to each slave USR1 and USR2. The DATA values in the message, in which the time stamp zero is transmitted, are status information items and are not values for the peripheral inputs or outputs. It is thus again possible to transmit error information concurrently for each error or for each incorrect synchronization operation.

In the next data cycle, the slaves USR1 and USR2 then return the first currency parameters, which they have received beforehand from the master M, to the master M. The master M then sends the second currency parameter for each slave USR1 and USR2 accordingly. In this cycle, the slave USR1 or USR2 concurrently transmits its input information which is valid at this time. Hence, each slave USR1 and USR2 on the bus notes the time which is associated with the currency parameter.

Up to the next cycle, the master M has again obtained all of the output information from the last input information. In the next data cycle, this output information is then sent to each slave USR1 and USR2 with the next currency parameter. Since the slave USR1, USR2 knows that its output information, which it has received with this cycle, has been calculated from the input information coming from the last data cycle, it is able to reset its watchdog to the time of the last data cycle.

If cycles become detective in the meantime or if a user does not react in good time, then the corresponding slave or the master sends, by way of example, a zero or an FF or another definable value as currency parameter so that a synchronization operation is first run again and all of the users therefore know that their output information comes from obsolete input information. If this output information becomes older than is permitted for an output user or its associated output module, then the latter safely disconnects automatically or performs a safety-oriented function.

Each slave USR1 and USR2 is thus given its own watchdog time. This does not need to be monitored by the safe controller. It is also not necessary to send an absolute time information item concurrently in the protocol.

Error-free operation is thus basically ensured for both of the applications described above in that, so long as the master M executes the protocol for the next cycle synchronously, the new output information is available in the next cycle and all of the input users or modules provide their input information synchronously.

As can be seen from FIG. 3, the invention is also used in full systems in which the master M is a safe controller and/or a system coupler is used, the watchdog time being split in this case, since the system coupler is in this case both the master M in an underlying system and a slave in the overlying system.

The system coupler is therefore provided with a respective watchdog time for the outputs of the underlying system and a watchdog time for the inputs of the underlying system. The watchdog times on the output users and their output modules in the underlying system then need to be reduced as appropriate. This is essentially noncritical from the point of view of time, however, since safe inputs from overlying or underlying systems are conventionally always slower than inputs which are connected directly to the bus.

Even though the above description of the invention is based on a few preferred embodiments, it is possible for a person skilled in the art to see that modifications within the scope of protection defined by the appended claims are covered.

Thus, in particular, the invention also covers developments in which safe and/or normal users with and/or without time information are present in a mixture on the same bus, the data are processed in the master and/or in one or more slaves, and/or the system is not a master/slave system but rather a system in which, by way of example, the master function is forwarded in a similar manner to a token ring approach.

In addition, it is not imperative for the communication always to take place via a master. Alternatively, for the application of the invention, the communication may also take place without a master directly between slaves and/or via a master which merely forwards the data from one slave to another without altering them. In addition, slaves for the application of the invention may have safe digital/analog inputs and/or safe digital/analog outputs.

The invention may thus essentially be used in all data processing systems in which it is possible to ensure that all of the users receive a type of "clock signal" or "pulse" at the same instant and, in particular, in which it is important to ensure that the outputs adopt a defined state if there is no current input information present.

What is claimed is:

1. A method for ensuring maximum reaction times in a data processing system between an input signal, and a corresponding output signal, comprising:
    reading in input and/or output data, which are present on the input side of users incorporated in the system, synchronously during each data cycle;
    checking input and/or output data (IN, OUT), which have been read in, in relation to currency parameters, which are based on at least one data cycle and are or can be associated with the input and/or output data which have been read in; and
    identifying an error in response to a defined discrepancy being reached between at least one currency parameter and a defined currency threshold, wherein a defined function is triggered in response to identification of an error.

2. The method according to claim 1, wherein the step of checking is performed during each data cycle.

3. The method according to claim 1, wherein the read-in operation is synchronized by virtue of a synchronization signal being sent, at least intermittently, to all users by one selected user.

4. The method according to claim 3, wherein the users include at least one master and at least one slave, wherein input data is processed to produce output data by virtue of two slaves communicating directly or via a master and/or data being able to be forwarded via a master from one slave to another without alteration and/or a master function being able to be transferred.

5. The method according to claim 4, wherein said synchronization signal is sent to all slaves by a master.

6. The method according to claim 1, wherein a synchronization signal is sent when the system is started and/or after a system and/or user based error.

7. The method according to claim 1, wherein the read-in operation is synchronized by sending a broadcast and/or latch signal to all users with each data cycle.

8. The method according to claim 1, wherein data is forwarded using ring shift registers.

9. The method according to claim 1, wherein each user concurrently counts the (valid) data cycles and/or one selected user transfers currency parameters together with data which are to be read in.

10. The method according to claim 1, wherein each user forwarding data identifies errors by adding its own time for the read-in operation to a time for the read-in operation which has been obtained from the currency parameter.

11. The method according to claim 1, wherein, additionally, the user producing currency parameters or an output user evaluates the currency parameter.

12. The method according to claim 11, wherein the currency parameter is evaluated to determine and/or monitor the maximum time for an input information item and/or in relation to a reaction time which is based on the input information item.

13. The method according to claim 1, wherein input data are processed by a selected user to produce output data within a prescribed/prescribable maximum time.

14. The method according to claim 1, wherein a currency parameter to be assigned by a user is reset in response to the reading-in of an output information time which is based on an input information item in the correct time sequence.

15. The method according to claim 14, wherein the currency parameter is a counter and/or a watchdog time.

16. The method according to claim 1, wherein currency parameters are monitored centrally or locally.

17. A data processing system which is suitable for carrying out the method as claimed in claim 1.

18. The system according to claim 17, wherein the users are selected from the group consisting of safe and/or nonsafe input users, output users, users with associated input and/or output modules, and users that have safe digital/analog inputs and/or safe digital/analog outputs.

19. The system according to claim 17, wherein the master is a safe controller and/or part of a system coupler.

20. The system according to claim 17, wherein, additionally, each user has at least one watchdog time.

21. The system according to claim 17, wherein users are present in a mixture with and without time information on the same bus.

22. The system according to claim 21, wherein the same bus is a ring bus.

23. The system according to claim 17, wherein at least one user has an associated intelligent unit having driver-like means for producing alternating currency parameters, which are available in unique form and/or in fixed time and/or cycle structures over a definable period of time.

24. The system according to claim 17, wherein a user producing at least one currency parameter and/or an output user has a unit which evaluates the currency parameter.

25. The method according to claim 1, wherein said input signal is a safe input signal, and said corresponding output signal is a safe output signal.

26. The method according to claim 1, wherein said defined function is a safety-oriented function.

27. The method of claim 1, wherein said defined function is a safety-oriented function, and wherein the currency parameter is a counter and/or a watchdog time.

* * * * *